United States Patent [19]

Miyaoka et al.

[11] 3,798,355

[45] Mar. 19, 1974

[54] FLYING-SPOT SCANNER SYSTEM

[75] Inventors: Senri Miyaoka, Kanagawa; Akio Ohgoshi, Tokyo, both of Japan

[73] Assignee: Sony Corporation, Tokyo, Japan

[22] Filed: June 23, 1972

[21] Appl. No.: 265,809

[30] Foreign Application Priority Data

July 24, 1971 Japan ................................ 46-45822

[52] U.S. Cl.. 178/5.4 CD, 178/5.2 D, 178/DIG. 28, 178/7.7

[51] Int. Cl. .............................................. H04n 9/04

[58] Field of Search.... 178/5.2 D, 5.4 CD, DIG. 28, 178/7.7

[56] References Cited

UNITED STATES PATENTS 3,655,908 4/1972 Goldberg et al. ............. 178/5.4 CD 3,701,847 10/1972 Miyauchi et al. ............. 178/5.4 CD

*Primary Examiner*—Richard Murray

*Attorney, Agent, or Firm*—Lewis H. Eslinger, Esq.; Alvin Sinderbrand, Esq.

[57] ABSTRACT

A flying-spot scanner system for light scanning a plurality of film or slide images simultaneously to produce electric signals corresponding to the images and employing a single cathode ray tube forming a plurality of separate rasters on its screen as flying-spot light sources. An optical lens device common to the plural rasters is provided to project images of the rasters on the respective film or slide images, so that the flying-spot scanning is performed with accurate synchronization between the plural images.

6 Claims, 5 Drawing Figures

FLYING-SPOT SCANNER SYSTEM

BACKGROUND OF THE INVENTION

1. Field of the Invention

This invention relates generally to flying-spot scanner systems, and more particularly to flying-spot scanner systems for scanning a plurality of image fields simultaneously.

2. Description of the Prior Art

A so-called Electronic Video Recorder (EVR) has heretofore been proposed as a color video signal reproducing apparatus in which a flying-spot scanner with a high-intensity cathode ray tube as a flying-spot light source is employed for converting a monochrome film image or slide image into a color video signal.

With such apparatus, one image of an object, which must be converted to a luminance signal, and a second image, which must be converted to a chrominance signal for representing color of the object, are generally printed on a monochrome film. Both the images on the film are scanned at the same time with a flying-spot cathode ray tube, and the scanned images are converted to electric signals through a photocell or other suitable photoresponsive device to generate a color video signal. Based upon the color video signal generated in this manner, a color picture is reproduced on a color television receiver. In this case, if the corresponding portions of both images on the monochrome film are not light-scanned accurately at the same time, a so-called color mis-registration is produced in the reproduced color picture. Accordingly, it is important to carry out the flying-spot scanning operation properly.

In conventional EVR apparatus, a single-beam flying-spot cathode ray tube is employed, and light from the single raster formed on the screen of the cathode ray tube is optically projected along two paths and the images on the film are scanned by this optically-separated light from the raster. Accordingly, it is required that optical systems be positioned in such a manner that flying-spot scannings for both the images correspond precisely with each other. An adjusting mechanism to achieve this is complicated in construction, and its handling is also very complicated and annoying. It is also difficult to cause the flying-spot scannings of both images to correspond with each other even by means of the adjusting mechanism and, therefore, the quality of the reproduced color picture is deteriorated.

Accordingly, it is highly desired that a flying-spot scanner system free from the drawbacks of the prior art described above be provided.

An object of the invention is to provide an improved flying-spot scanner system in which the above-mentioned disadvantages present in conventional EVR systems are avoided.

Another object of the invention is to provide a flying-spot scanner utilizing a novel cathode ray tube as a flying-spot light source which allows the use of a simplified optical means for scanning images with the light from the cathode ray tube.

A further object of the invention is to provide a flying-spot scanner utilizing a novel cathode ray tube as a flying-spot light source, which is suitable for simultaneously scanning a plurality of images mutually related to one another.

A still further object of the invention is to provide a novel cathode ray tube suitable for use as a flying-spot light source.

The other objects, features and advantages of the invention will be apparent from the following description taken in conjunction with the accompanying drawings.

SUMMARY OF THE INVENTION

In order to avoid the drawbacks encountered in the prior art, the present invention includes a cathode ray tube, which generates the same number of electron beams as the number of images to be scanned simultaneously. For example, two electron beams can be generated and passed through a common deflection device to form two independent or separate rasters on its screen. Such a tube can be used as a flying-spot light source for EVR apparatus. Further in accordance with this invention an optical system is provided in scanning the images on the film by means of the respective rasters.

DESCRIPTION OF THE PREFERRED EMBODIMENT

Figure 1:
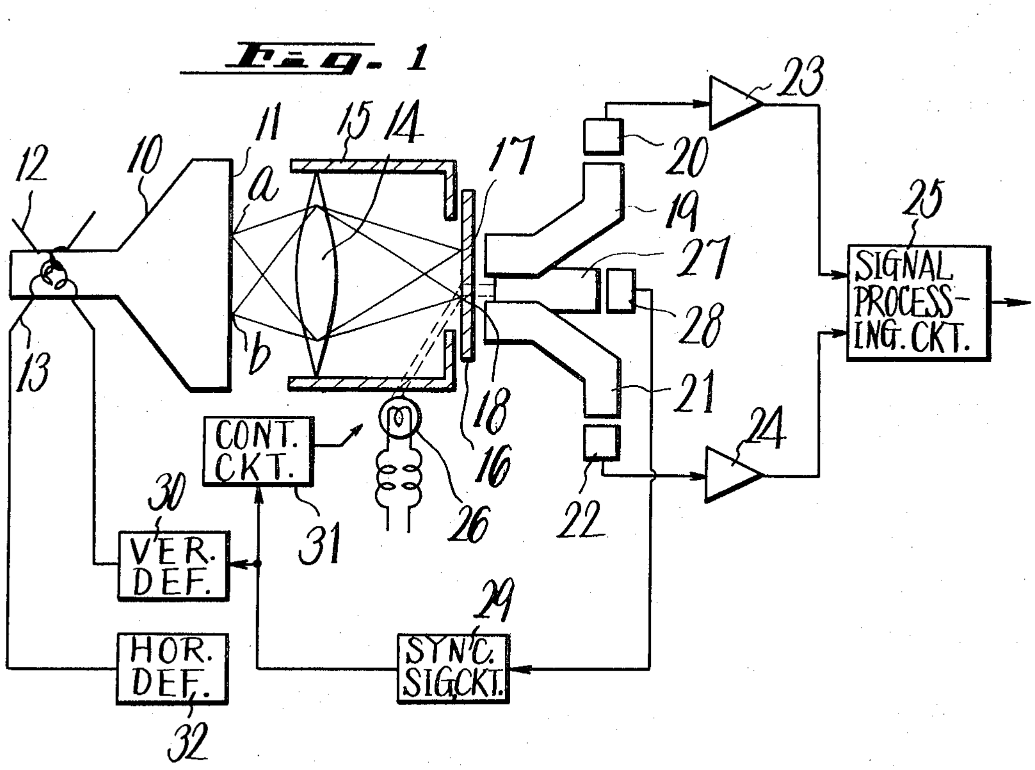
FIG. 1 is a schematic plan view, partially in cross-section, for illustrating one embodiment of a flying-spot scanner system according to the invention.

In FIG. 1 reference numeral 10 generally designates a cathode ray tube which has a screen 11. A deflection device consisting of a vertical deflection coil 12 and a horizontal deflection coil 13 mounted on the cathode ray tube 10 deflects two separate electron beams of the cathode ray tube 10 simultaneously to form two separate rasters *a* and *b* on the screen 11 simultaneously. The light emitted from the rasters *a* and *b* is projected by a lens 14 in an optical device 15 and is focused on a film 16 as two images 17 and 18. The image 17 corresponds to a luminance signal, and the image 18 corresponds to a chrominance signal. The light which has scanned the image 17 on the film 16 is led by an optical pipe 19 to a photoresponsive device 20, such as a multiplier phototube. The phototube 20 converts the light into an electric signal as the luminance signal. The light which has scanned the image 18 on the film 16 is led through a second light transmitting pipe 21 to a second multiplier phototube 22 and is converted into a second electric signal as the chrominance signal. The luminance and chrominance signals from the first and second multiplier phototubes 20 and 22 are respectively amplified by amplifiers 23 and 24 and are then supplied to a signal processing circuit 25 as a color television signal.

In this case, the film 16 is driven to run along the direction perpendicular to the plane of the sheet of FIG. 1. Reference numeral 26 indivates a light source such as, for example, a lamp which serves to throw light onto a perforation bored in the film 16 for generating a synchronizing signal. The light emanated from the lamp 26 and passed through the perforation of the film 16 is led through a light transmitting pipe 27 to a third multiplier phototube 28. The third multiplier phototube 28 then generates the synchronizing signal which is supplied to a synchronizing signal circuit 29 and then is made to be a desired control signal. This control signal is used in a vertical deflection circuit 30 to control the vertical deflection current flowing through the vertical deflection coil 12. The control signal from the synchronizing signal circuit 29 is also supplied to a control circuit 31 to be used for controlling a driving device (not shown in the figure) of the film 16. The horizontal deflection coil 13 is supplied with horizontal deflection current from a horizontal deflection circuit 32.

Figure 2:
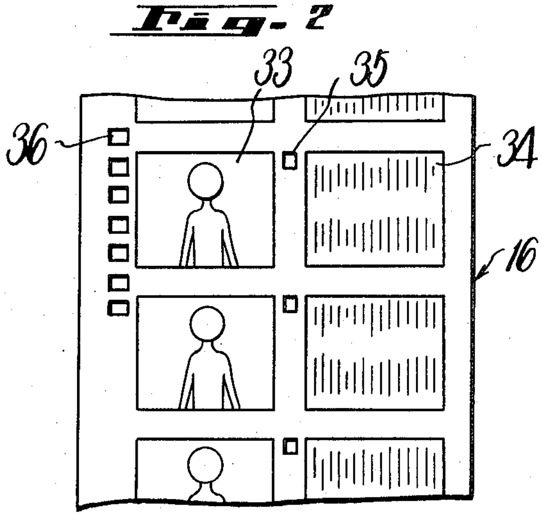
FIG. 2 shows a strip of film which can be employed in the invention.

As shown in FIG. 2, the film 16 is a kind of monochrome film and the images are printed thereon a plurality of pairs of frames. The plurality of pairs of frames are sequentially arranged along the longitudinal direction of the film 16 and the two frames of each pair are arranged along the width of the film 16, as seen in FIG. 2. One frame of each pair contains an image 33 to be converted into the luminance signal, while the other frame contains an image 34 to be converted into the chrominance signal. A perforation 35 for generating the synchronizing signal is bored in the film 16, for example, between the frames of each pair. During movement of the film 16, light directed at a specific point on the path followed by the perforation 35 generates the synchronizing signal when the light passes through the perforation 35, as described above. The film 16 has also a plurality of perforations 36 along its one side to be driven by the film driving device.

Figure 3:
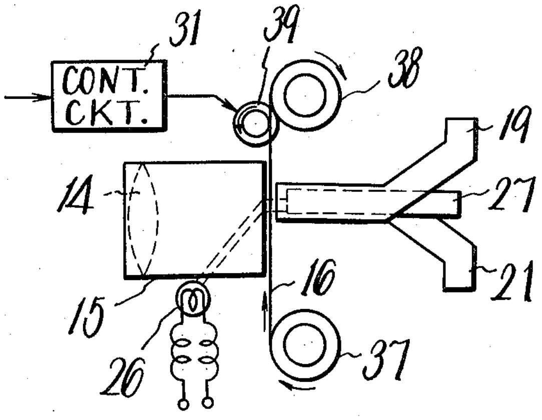
FIG. 3 shows some optical components of FIG. 1.

As best seen in FIG. 3, the film 16 is wound on a supply reel 37 and a takeup reel 38, respectively, and is driven by the film driving device 39 at a predetermined speed between the optical device 15 with the lens 14 and the light transmitting pipes 19 and 21. The film driving device 39 is controlled by the control circuit 31 in operation.

One embodiment of the cathode ray tube 10, which is used in the flying-spot scanner system of the invention as a flying-spot light source will be described hereinbelow with reference to FIG. 4. This tube includes an electron gun 40 for generating two electron beams $B_1$ and $B_2$. It may also be possible to employ two electron guns. The electron gun 40 includes a common first, or control, grid 41, a second, or accelerating, electrode 42, a third grid, or first anode, 43, a fourth grid, or focusing electrode, 44 and a fifth grid, or second anode, 45. In this case all the grids are coaxially arranged on an axis in this order listed. Two cathodes (cathode sleeves) 46 and 47 are provided in a plane perpendicular to the axis, for example, in the horizontal plane.

The first and second grids 41 and 42 are formed to be, for example, cup-shaped and have bored apertures 48, 49 and 50, 51 at the positions opposing to the cathodes 46 and 47 respectively. The third, fourth and fifth grids 43, 44 and 45 are formed to be cylinder-shaped.

In operation, a voltage of about 0 to −400 volts is applied to the first grid 41, a voltage of about 0 to 500 volts to the second grid 42, a voltage of about 13 to 20 kilovolts to the third and fifth grids 43 and 45, and a voltage of about 0 to 400 volts to the fourth grid 44, respectively. Thus, a prefocusing electron lens $L_s$ at the pre-stage is formed mainly between the second and third grids 42 and 43, and a main focusing electron lens $L_m$ is formed by the third, fourth and fifth grids 43, 44 and 45.

The electron beams $B_1$ and $B_2$ emitted from the respective cathodes 46 and 47 reach the pre-focusing electron lens $L_s$ through the apertures 48, 49 and 50, 51 of the first and second grids 41 and 42 and are prefocused thereby. The pre-focused electron beams $B_1$ and $B_2$ then arrive at the main focusing electron lens $L_m$, which focuses both beams B and B and acts to decrease the beam distortion in the beams. Both beams pass through the lens Lm, intersecting each other substantially at the center of the lens Lm.

Figure 4:
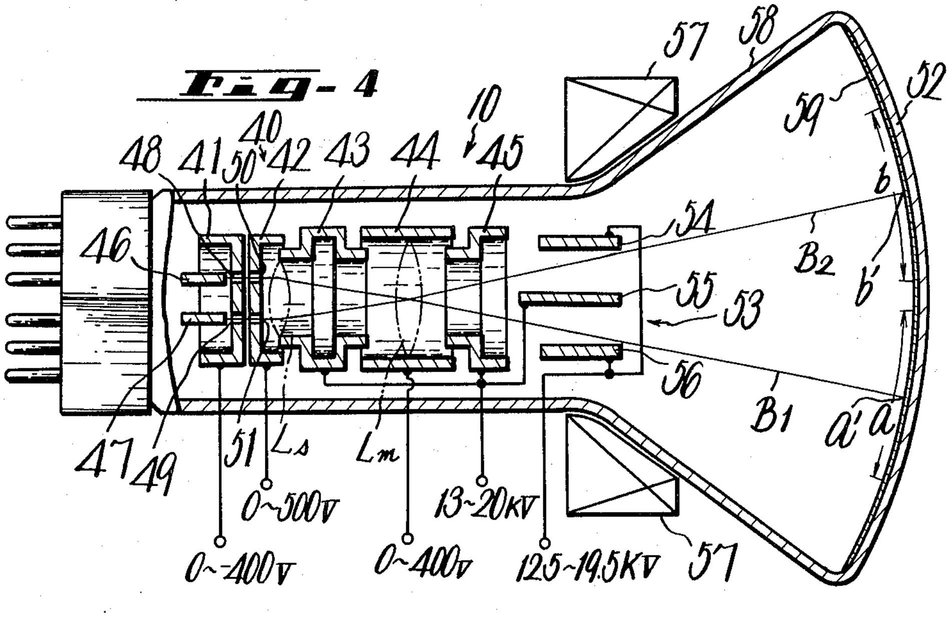
FIG. 4 is a cross-sectional view of a cathode ray tube that can be used in the invention and FIG. 5 is a front view of the cathode ray tube depicted in FIG. 1.
Figure 5:
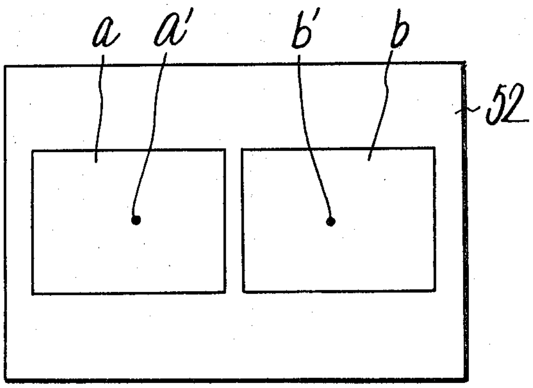

In FIG. 4, reference numeral 53 indicates a deflection means disposed ahead of the electron gun 40 which operates to deflect the electron beams $B_1$ and $B_2$ in order to avoid having the flying-spot rasters *a* and *b* formed on the screen 52 by the electron beams $B_1$ and $B_2$ overlap each other. The deflection device 53 can be composed of three electrostatic deflection plates 54, 55 and 56 which are disposed almost in parallel with one another as shown in the figure. In this case, the deflection plates 54, 55 and 56 intersect the plane including the electron beams $B_1$ and $B_2$ at substantially right angles and are arranged on a plane parallel to the axis of the tube. In the illustrated embodiment, the deflection plate 55 is disposed on the axis, the electron beam $B_2$ passes through between the plates 54 and 55, and the electron beam $B_1$ passes through between the plates 55 and 56. A potential the same as that applied to the fifth grid 45 is applied to the center deflection plate 55, and a potential lower than that of the deflection plate 55, for example, a potential of 12.5 to 19.5 kilovolts is applied to the external deflection plates 54 and 56 respectively. The potential applied to the plates 54 and 56 is lower than that applied to plate 55 by, for example, several hundred volts. Accordingly, if a horizontal and vertical deflection yoke 57 for beam scanning carries out no deflection operation, the electron beams $B_1$ and $B_2$ arrive approximately at the centers of the respective flying-spot pictures *a* and *b* (the centers being referred as at *a'* and *b'*). In other words, the potentials applied to the plates 54 and 56 are adjusted to ensure the positions of the beams $B_1$ and $B_2$ on the flying-spot pictures *a* and *b* mentioned above. If horizontal and vertical deflection currents are supplied to the deflection yoke 57 when the apparatus is at such a condition described above, the electron beams $B_1$ and $B_2$ are simultaneously deflected about the center points *a'* and *b'* to form two separate flying-spot pictures without being overlapped with each other on the screen 52 as shown in FIG. 5. In FIG. 5, reference numeral 58 indicates an envelope and 59 a phosphor layer formed on the inner surface of the face plate of the envelope 58.

As described above, according to this invention a color picture superior in quality as compared with the prior art can be reproduced by provision of the common cathode ray tube 10 and the optical device 15 with the common lens 14.

Further, with this invention the optical device can be made simpler than the prior art in construction and there is no need to separately adjust the optical device for the respective images 17 and 18 on the film 16, so that the present invention is easy in adjustment of the whole apparatus.

With this invention a so-called color mis-registration appearing in a reproduced color picture resulting from both the images can be adjusted in such a manner that the positions of the two flying-spot pictures *a* and *b* on the screen 52 of the cathode ray tube 10 are adjusted. In other words, a potential applied to the deflection plate 54 can be varied with respect to that applied to the deflection plate 56 of the deflection device 53 or potentials applied to both the deflection plates 54 and 56 can be simultaneously varied with respect to that applied to the deflection plate 55 to control the distance between the electron beams $B_1$ and $B_2$. Alternatively, an auxiliary deflection means, for example, a coil may be provided on the envelope 58 near the deflection yoke 57 and current applied to the coil can be controlled to adjust the positions of the electron beams $B_1$ and $B_2$ at the screen 52.

With the invention, further, if the flying-spot pictures *a* and *b* are distorted, the dynamic convergences therefor can be independently adjusted.

It will be apparent, therefore, that in the invention all the adjustment can be achieved electrically and easily.

In the above described embodiment the electron beams $B_1$ and $B_2$ are deflected to form the flying-spot pictures *a* and *b*, but it may be apparent that the electron beams can be deflected to form only bright lines in the horizontal direction while the film travels continuously.

Further, it may be similarly considered to form two or more flying-spot pictures and scan two or more images simultaneously.

It will be apparent that many variations and changes can be effected without departing from the scope of the novel concepts of this invention.

What is claimed is:

1. A flying-spot scanner system for scanning plurality of optical images to produce electrical signals representing the images, said system comprising:

A. A cathode ray tube comprising:
   1. A fluorescent screen
   2. An electron gun to generate a pair of electron beams directed toward said screen, said gun comprising a main focusing lens to focus said beams, said beams intersecting each other in the field of said lens, and
   3. Positioning means for adjusting the aim of said beams to selected separate pattern locations on said screen, said positioning means comprising a central plate substantially perpendicular to the plane defined by said beams, and two side plates on opposite sides of said central plate, each of said beams passing between said central plate and a respective one of said side plates;

B. Means to apply controllable positioning voltage to said positioning means to adjust the pattern locations;

C. Optical material having a plurality of optical image areas at predetermined locations;

D. An optical device disposed between the screen of said cathode ray tube and said optical material and comprising a lens common to said separate patterns to project images of said patterns on the respective optical image areas on said optical material; and E. Means for producing electrical signals in response to the scanning of said image areas by the light from said patterns focused on said image areas.

2. A flying-spot scanner system according to claim 1 wherein said cathode ray tube provides the separate patterns on said screen simultaneously, and said lens in the optical device projects the images of each of said patterns on the respective optical image areas simultaneously, said system also comprising scanning means to deflect said beams to form said patterns as rasters having substantially horizontal lines.

3. A flying-spot scanner system according to claim 2 wherein said scanning means of the cathode ray tube comprises means for deflecting said separate rasters in a horizontal direction.

4. A flying-spot scanner system according to claim 3 wherein said optical material is a film having a plurality of frame rows of different kinds parallel to each other in said horizontal direction and vertically spaced from each other and extending along said film, said film being driven in the vertical direction so that the images from said separate rasters are projected on respective frame rows.

5. A cathode ray tube for use in a flying-spot scanner system, said tube comprising:

A. An envelope comprising a face plate;

B. A luminous screen on the inner surface of said face plate;

C. An electron gun within said envelope for generating first and second electron beams directed toward said screen, said gun comprising a main focusing lens to focus said beams, said beams intersecting each other in the field of said lens; and D. Electrode means between said electron gun and said screen and perpendicular to a plane common to said beams to deflect said beams to predetermined landing areas on said screen, said landing areas being spaced far enough apart to permit said beams to be deflected simultaneously to form non-overlapping rasters on said screen, said electrode means comprising a central plate substantially perpendicular to the plane defined by said beams, and two side plates on opposite sides of and substantially parallel to said central plate, each of said beams passing between said central plate and a respective one of said side plates.

6. A cathode ray tube according to claim 5 in which said side plates are directly electrically connected together.

* * * * *